No. 838,067. PATENTED DEC. 11, 1906.
J. F. WHITE.
WAGON DUMP.
APPLICATION FILED FEB. 12, 1906.
6 SHEETS—SHEET 3.
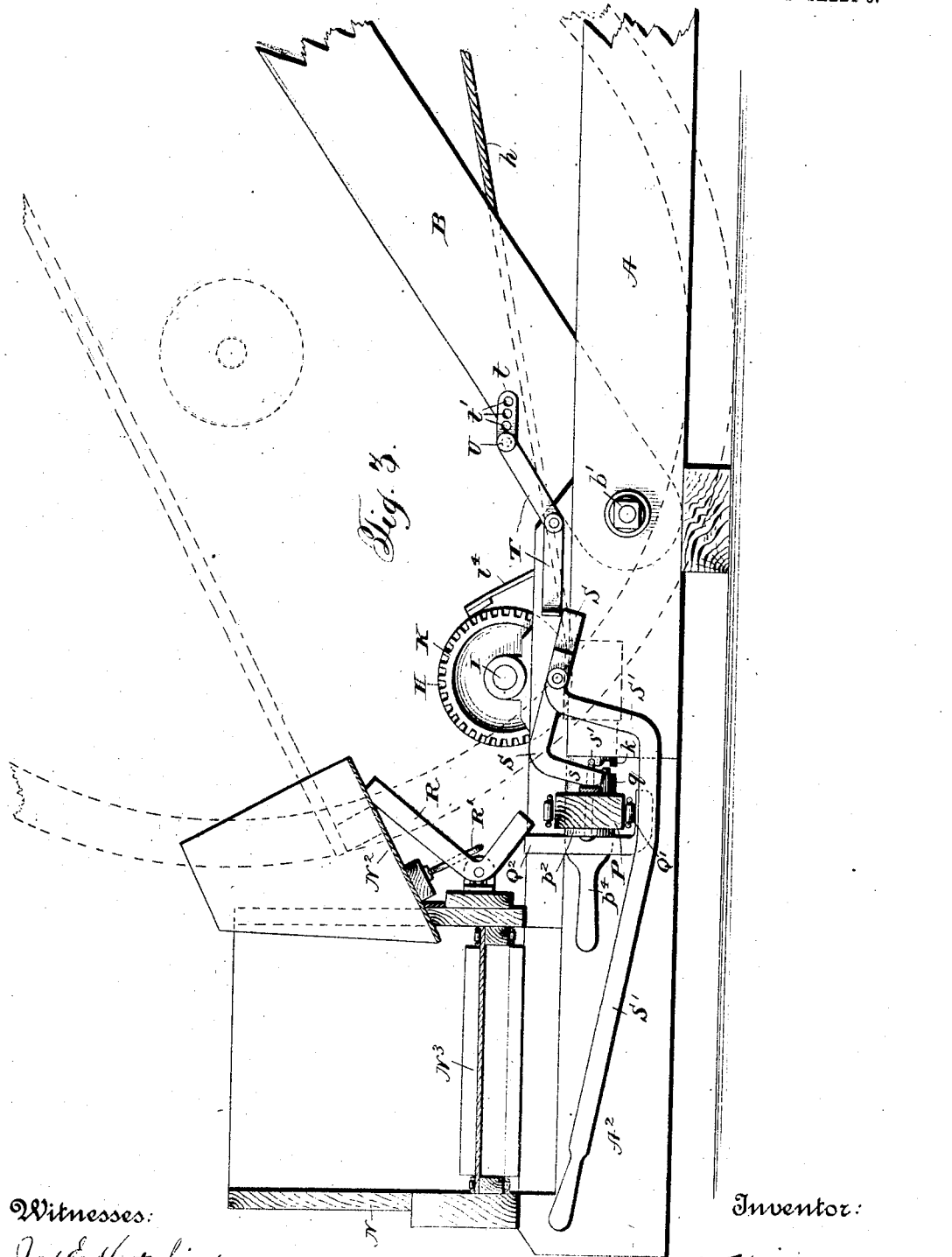

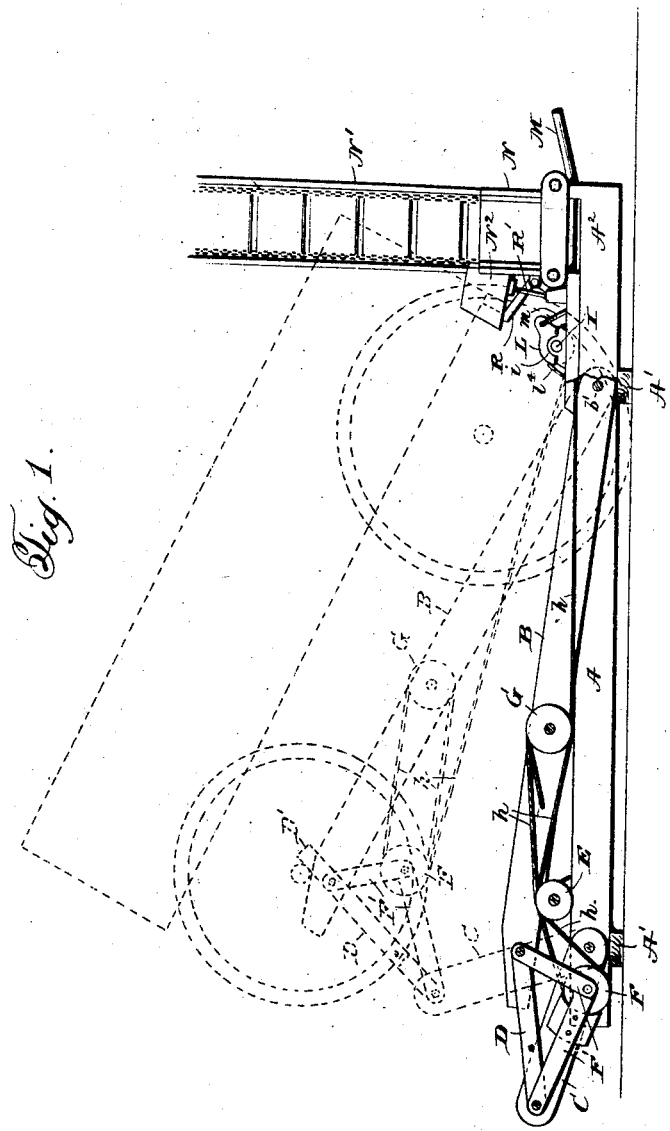

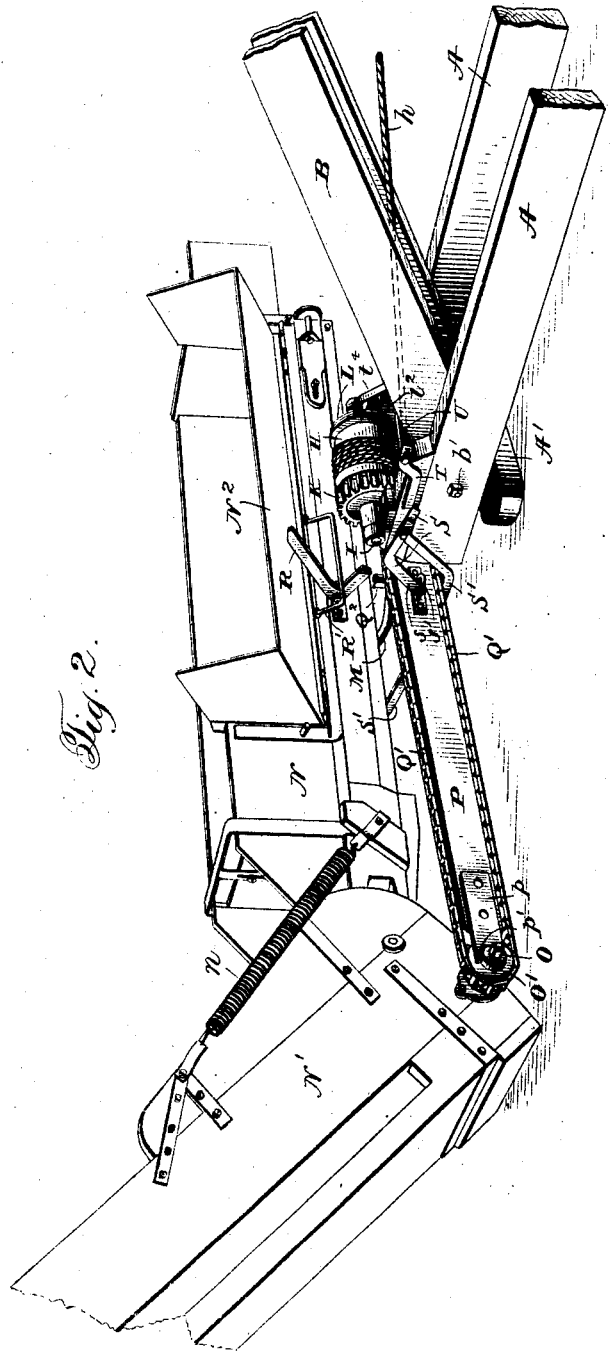

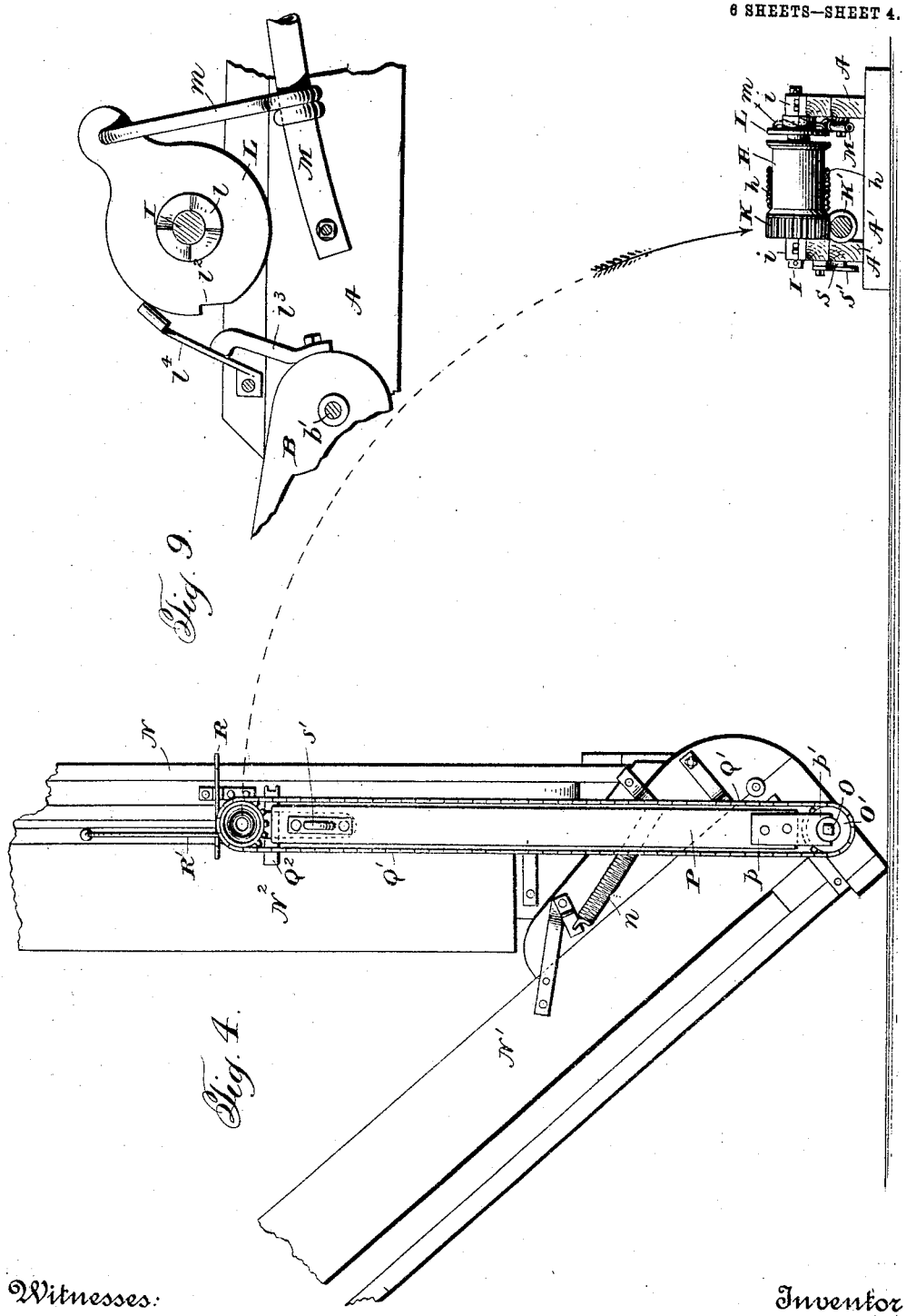

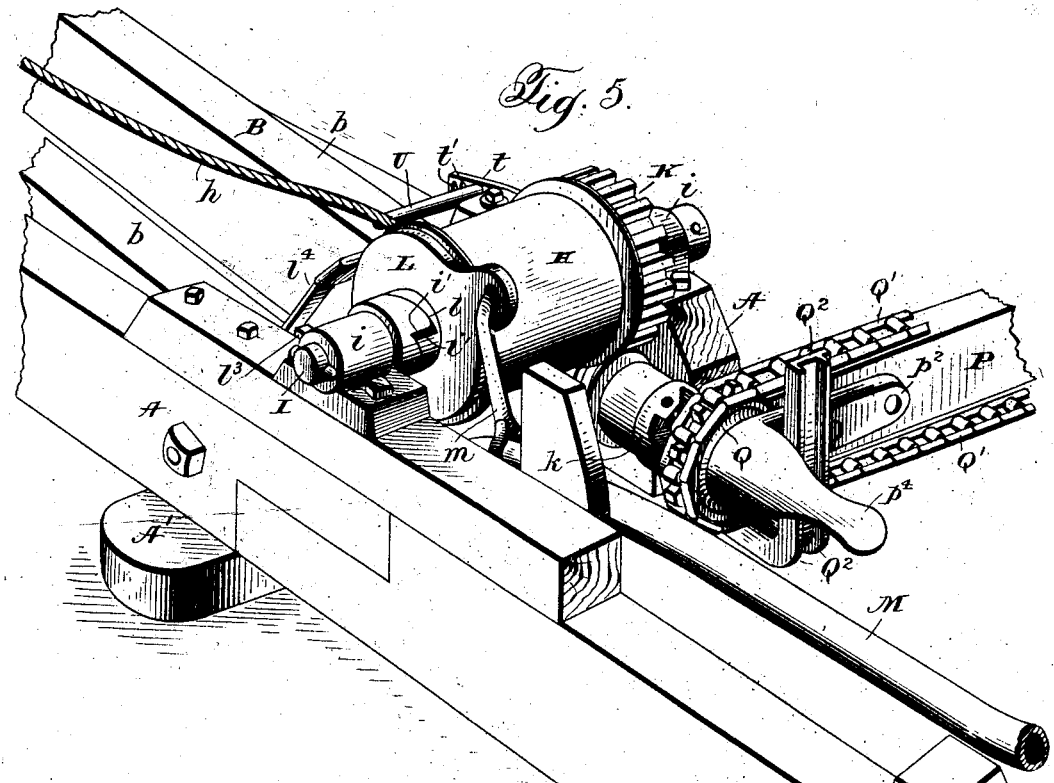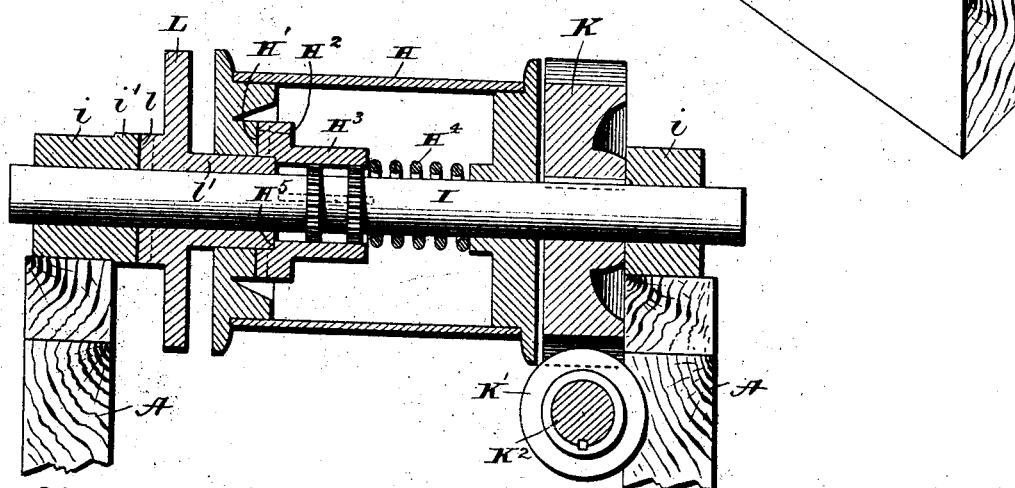

No. 838,067. PATENTED DEC. 11, 1906.
J. F. WHITE.
WAGON DUMP.
APPLICATION FILED FEB. 12, 1906.
6 SHEETS—SHEET 6.
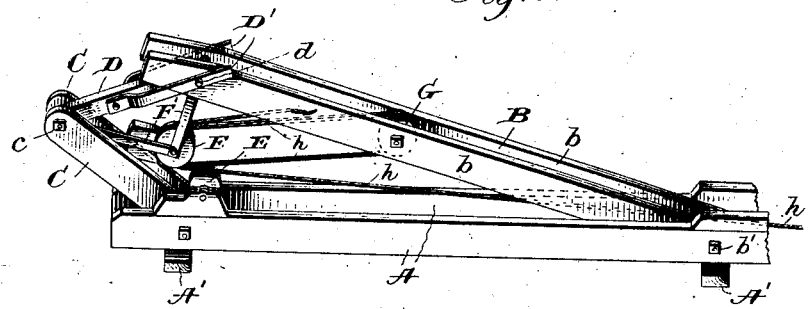
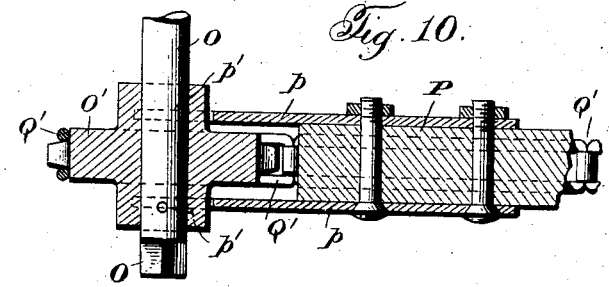
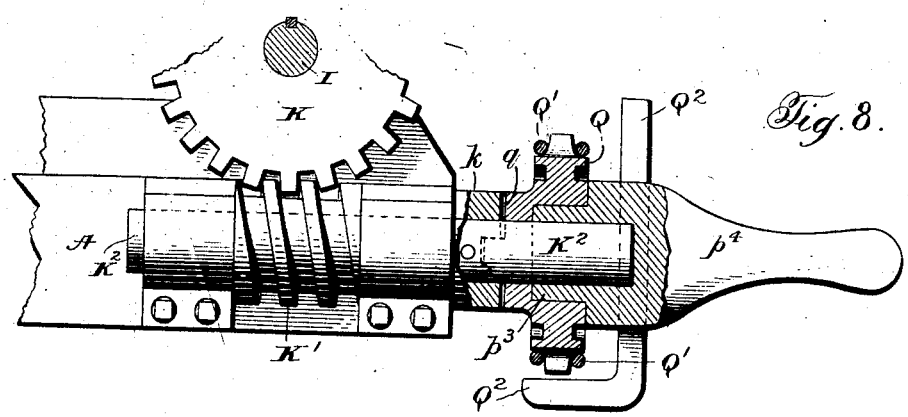
Witnesses:
Jas E Hutchinson
Tho R Heath
Inventor:
John F. White,
By ........... Attorneys

UNITED STATES PATENT OFFICE.

JOHN F. WHITE, OF BLOOMINGTON, ILLINOIS.

WAGON-DUMP.

No. 838,067.          Specification of Letters Patent.          Patented Dec. 11, 1906.

Application filed February 12, 1906. Serial No. 300,828.

*To all whom it may concern:*

Be it known that I, JOHN F. WHITE, a citizen of the United States, residing at Bloomington, in the county of McLean and State of Illinois, have invented certain new and useful Improvements in Wagon-Dumps, of which the following is a specification, reference being had therein to the accompanying drawings.

This invention relates to improvements in wagon dumps or jacks, and more particularly to that class of wagon-dumps in which an elevator or jack is employed to raise the forward end of a wagon to discharge the load contained therein into a drag or feeder, from which it is conveyed to any suitable form of conveyer or other apparatus, said drag or feeder being movable away from the jack to permit a wagon to be driven thereover into position to be dumped.

The object of the present invention is the simplification of dumps of this character by dispensing with all platforms and overhead framework, such as is sometimes employed for raising and lowering the wagon, and utilizing a simple form of jack and hoisting mechanism therefor, which are positioned between the wheels of the wagon, so as to be straddled thereby when the same is driven thereover into position to be dumped.

A further object of the invention is the provision of means for connecting the hoisting mechanism of the jack with the driving mechanism of the drag or feeder, which can be readily disconnected when it is desired to move the feeder to a position to permit a wagon to be driven over the jack into position to be raised.

A further object of the invention is the provision of means adapted to be actuated by the rear end of the wagon when it reaches its dumping position for automatically releasing the hoisting mechanism.

A further object of the invention is the provision of means for automatically releasing the hoisting mechanism when the jack reaches its upward limit of travel.

A further object of the invention is the provision in a device of this character of a jack, hoisting mechanism therefor, including a drum, means for releasing the drum to permit the lowering of the jack, and means for simultaneously braking the lowering movement of said jack.

A still further object of the invention is the provision in a device of this character of a jack or elevator, hoisting mechanism therefor, means for releasing said hoisting mechanism, a brake for governing the downward movement of the jack, and means preventing the releasing of said brake until the jack reaches the limit of its downward movement.

Other objects of the invention will be apparent from the detailed description hereinafter when read in connection with the accompanying drawings, forming a part hereof, wherein a preferable embodiment of my invention is shown, and wherein like letters of reference refer to similar parts in the several views.

In the drawings, Figure 1 is a side elevation, with parts broken away, of my improved jack in its lowered position, the elevated position of said jack being indicated in dotted lines. Fig. 2 is a fragmentary perspective view showing the manner of connecting the actuating mechanism of the jack to the driving mechanism of the elevator. Fig. 3 is a side elevation of the rear end of the jack, the drag and connecting-bar being shown in cross-section. Fig. 4 is a cross-section of the jack, the drag and connecting-bar being shown in elevation in their raised position. Fig. 5 is a perspective of the rear end of the jack and the connecting-bar for connecting the actuating mechanism thereof with the driving mechanism of the elevator. Fig. 6 is a perspective view of the jack with parts broken away. Fig. 7 is a longitudinal section of the hoisting-drum. Fig. 8 is a detail view, partly in section, showing the manner of connecting the actuating mechanism of the jack with the connecting-bar. Fig. 9 is a detail view showing the means for preventing the release of the brake until the jack reaches the downward trend of its travel, and Fig. 10 is a detail sectional view showing the manner of connecting the connecting-bar to the drive-shaft of the elevator.

Referring more particularly to the drawings, A A designate a pair of longitudinally-disposed spaced supporting-beams which are supported upon and secured in any suitable manner to the cross-pieces A' A', which are adapted to rest upon the ground.

B designates the jack, which comprises a pair of beams *b b*, the lower ends of which extend between the spaced supporting-beams A A adjacent one end thereof and are pivotally connected thereto by means of a pivot-bolt *b'* passing therethrough. The upper surfaces of the beams *b b*, forming the jack B, are slightly beveled at their outer end to form a seat for the forward axle of the wagon to be dumped.

C C designate a pair of links, the lower ends of which extend between and are pivotally connected to the forward ends of the supporting-beams A A by a suitable pivot-bolt passing therethrough.

D designates a link one end of which extends between and is pivotally connected to the outer end of the jack-beams b b by means of a pivot-bolt d passing therethrough and the other end of which extends between and is pivotally connected to the upper ends of the links C C by means of a pivot-bolt c passing therethrough.

It will be seen that the links C C and the link D form a toggle connection between the forward end of the jack B and the supporting-beams A A, by means of which said jack may be raised and lowered.

D' D' designate a pair of straps secured at their lower ends to opposite sides of the link D and apertured adjacent their upper ends to fit over the projecting ends of the pivot-bolt d. The straps D' D' form, in effect, a part of the link D, and their upper ends project beyond the upper surfaces of the beams b b of the jack at some distance from the end thereof and serve as a stop to prevent the axle of the wagon supported thereon from slipping downwardly along the upper surface of the jack as the same is elevated.

I will now describe the means employed for straightening the links C C and D to effect the elevation of the jack B. E designates an idle pulley journaled in suitable bearings secured to the upper surfaces of the supporting-beams A A, just in rear of the point of pivotal connection of the links C C therewith. F designates a sheave journaled in the apex portion of a V-shaped bracket F', the free ends of the arms of said bracket extending between the beams forming the jack B and the links C C and being provided with apertures through which the pivot-bolts d and c pass. G designates a sheave journaled between the beams forming the jack B some distance in rear of the connection of the link D therewith. A cable h passes from a hoisting-drum H, to be hereinafter more particularly described, over the upper side of the idler E, under and around the sheave F, over and around the sheave G, under and around the sheave F, over and around the sheave G, and under and around the sheave F, the free end of said cable being secured to one of the beams of the jack B. The V-shaped bracket F' is of such a size that when the jack is in its closed position the sheave F, carried thereby, will extend between the links C C and some distance below the upper surface of the idler E, so that when power is applied to the drum H to wind up the cable h a direct upward pull will be obtained upon sheave F, which will cause the arm of the V-shaped bracket F', which is connected to the pivot-bolt d, to slightly elevate the outer end of the jack B, and thereby tend to straighten the links C C and the link D. This upward pull will continue until the sheave F is elevated above the upper surface of the idler E, when the pull will be directly upon the sheave F, which will cause the arm of the V-shaped bracket F', which is connected to the pivot-bolt C, to complete the straightening of the links C, C, and D, and thereby elevate the jack B to the desired extent.

I designates a drum-shaft loosely mounted in bearings i i, secured to the upper surfaces of the supporting-beams A A, directly in rear of the point of pivotal connection of the jack B therewith, one of said bearings being formed with a ratchet-surface i' on the inner side thereof.

H designates a hoisting-drum loosely mounted on the drum-shaft I, and K designates a gear-wheel keyed to said shaft at one side of said drum H and meshing with a worm K', secured to a longitudinally-disposed shaft K², journaled in suitable bearings secured to the inner side of one of the supporting-beams A A. The rear end of the shaft K² has secured thereto at a slight distance from the end thereof a collar k, provided on its outer surface with a ratchet-surface, for a purpose to be hereinafter more particularly set forth. One of the heads of the drum H is provided on its inner surface with a ratchet-surface H', adapted to be engaged by a ratchet-face H², formed on the end of a sleeve H³, which is keyed to the drum-shaft I and longitudinally movable thereon. A spring H⁴, interposed between the end of the sleeve H³ and the opposite head of the drum H, serves to normally maintain the ratchet-face H² of the sleeve in engagement with the ratchet-face H' of the drum to lock said drum to the shaft I.

L designates a disk loosely mounted on the shaft I between one end of the drum H and the bearing i, which is provided with the ratchet-face i', said disk being provided on one side with a ratchet-face l, adapted to engage the ratchet-face i' on the bearing i, and on the opposite side with an elongated sleeve l', adapted to project through the head of the drum H and to abut against an inwardly-extending shoulder H⁵, formed in the interior of the sleeve H³.

M designates a rearwardly-extending brake-handle pivotally secured to the inner side of one of the supporting-beams A A, the outer end of said handle being bent upwardly to afford an operator easy access thereto. A link m connects the brake-handle with the disk L.

With the parts in their normal positions the ratchet-face l of the disk L is in engagement with the ratchet-face i' of the bearing i, and the ratchet-face $H^2$ of the sleeve $H^3$ is held by the spring $H^4$ in engagement with the ratchet-face $H'$ on the inner surface of the drum-head, so that when power is applied to the shaft $K^2$ the drum H will be rotated and the cable $h$, which is secured thereto, will be wound thereon. When, however, the load has been dumped and it is desired to lower the jack B and the wagon supported thereby, the operator depresses the brake-handle M, which, through the link $m$, rotates the disk L and simultaneously causes the same to move longitudinally upon the drum-shaft I, owing to the engagement of the ratchet-surface $l$ formed thereon with the ratchet-surface $i'$ formed on the bearing $i$. During the longitudinal movement of the disk L the sleeve $l$ carried thereby contacts with the inwardly-extending shoulder $H^5$ of the sleeve $H^3$ and moves the same a sufficient extent to disengage the ratchet-face $H^2$ thereof from the ratchet-face $H'$ on the interior of the drum H, thereby freeing said drum from the drum-shaft I, and at the same time the inner surface of the disk L is moved into engagement with the outer surface of the head of the drum H, thereby constituting a frictional brake to govern the speed of the lowering of the jack B and the wagon supported thereby. As soon as the pressure on the brake-handle M is released the spring $H^4$ returns the parts to their normal positions. In order to prevent the operator through carelessness from releasing the brake-handle before the jack and wagon carried thereby are completely lowered, and thereby throwing the clutch on the drum-shaft I into engagement with the drum, I provide a lock, which prevents the drum H from being connected with the shaft I until the jack B reaches the downward limit of its movement. This lock consists of a gravity-pawl $l^4$, pivotally secured to one of the supporting-standards A A, which is adapted to engage a ratchet-tooth $l^2$, formed in the periphery of the disk L when said disk is rotated to effect the release of the drum H. From this construction it will be apparent that the drum H cannot be connected to the drum-shaft I until the pawl $l^4$ is released from engagement with the ratchet-tooth $l^2$, regardless of the fact as to whether or not the operator releases the brake-handle M. The pawl $l^4$ is automatically lifted from out of engagement with the ratchet-tooth $l^2$ by a pin $l^3$, secured to the jack B in rear of its pivotal connection with the supporting-beams A A, which contacts therewith when the jack reaches its downward limit of travel.

N designates a drag or feeder, which is pivotally connected to the lower end of a conveyer N', which is of any suitable construction and which serves to conduct the grain to any suitable point as the same is dumped. The drag or feeder N is adapted when in its lower position to extend transversely of the supporting-beams A A just in rear of the hoisting mechanism, one of said beams being provided with an extension $A^2$, which is provided on its upper side with a recess or seat for the outer end of the drag. The drag N is normally held in a folded position against the conveyer N' by means of a spring $n$, so that a wagon may be driven over the jack into position for dumping. The side of the drag N adjacent the jack is provided with a pivoted chute $N^2$, into which the grain is adapted to be discharged, and said side is made longitudinally adjustable, so that the chute carried thereby may be moved to a position to be engaged by the rear end of the wagon-body after the same has been driven into position to be dumped. The drag N is provided with the usual apron-conveyer $N^3$, which is driven in any suitable manner from the drive-shaft O of the conveyer N'.

I will now describe the manner of connecting the drive-shaft O of the conveyer N' with the drive-shaft $K^2$ of the hoisting mechanism for the jack. The drive-shaft O of the conveyer N' projects therethrough and has secured to its free end a sprocket-wheel O'. P designates a connecting-rod provided on opposite sides with a pair of projecting plates $p$ at one end thereof, the free ends of which are provided with the inwardly-extending curved portions $p'$, which are adapted to embrace the shaft O at opposite sides of the sprocket-wheel O'. The opposite end of the connecting-rod P is provided on one side thereof with a projecting plate $p^2$, the free end of which is provided with an inwardly-extending sleeve $p^3$, which is adapted when the connecting-rod P is in its operative position to loosely embrace the projecting end of the drive-shaft $K^2$ of the hoisting mechanism of the jack. The plate $p^2$ is also provided on its outer face with a handle $p^4$, by which the connecting-rod may be disconnected from the end of the shaft $K^2$. Q designates a sprocket-wheel journaled on the sleeve $p^3$ and provided on its inner face with a ratchet-surface $q$, which is adapted when the connecting-rod P is slipped onto the end of the shaft $K^2$ to engage the ratchet-surface formed on the collar $k$ secured thereto. A sprocket-chain Q' connects the sprocket-wheels O' and Q. It will be seen from the above construction that owing to the manner of connecting the connecting-rod P with the drive-shaft O it can be moved laterally a sufficient amount to permit the engagement of the sleeve $p^3$ carried thereby with the end of the shaft $K^2$ and also can be moved vertically to occupy a position alongside of the conveyer N' when it is desired to drive a wagon into position to be dumped. $Q^2$ designates an L-shaped member secured to the outer surface of the plate $p^2$, one arm of which is arranged to underlie the underrun of the sprocket-chain Q' to prevent the same from contacting with the ground should the connecting-bar P become accidentally disengaged from the end of the shaft K², and the other arm of which extends upwardly above the upper run of the sprocket-chain Q'. R designates a bell-cranked lever pivotally secured to one side of the drag N below the chute N² pivoted therein, the free end of the lower arm of said lever being normally positioned to lie directly in front of the upwardly-extending arm of the L-shaped member Q² and the upper arm of said lever being positioned to be engaged by the under side of the chute N² when the same is moved downwardly. R' designates an elongated staple secured to the chute N² and inclosing the upper arm of the bell-crank lever R, said staple serving to prevent the bell-crank lever from falling to an inoperative position when the chute is folded within the drag.

Having described the construction of my improved wagon-dump, I will now set forth the operation thereof.

The drag N and the connecting-rod P normally occupy positions alongside of the conveyer N'. The wagon to be dumped is first driven over the jack, so as to straddle the same, to a position so that the front axle thereof will be engaged by the forward end of said jack when the same is raised. The connecting-bar P is then lowered, and the sleeve p³ carried thereby is slipped over the end of the shaft K² to cause the ratchet-surface carried by the sprocket-wheel Q to engage the ratchet-surface formed on the collar k, secured to said shaft. The drag N is then lowered to its horizontal position. With the parts in this position it will be apparent that when power is applied to the drive-shaft O of the conveyer N' the drive-shaft K² will also be driven, which will cause the hoisting mechanism to elevate the jack in the manner hereinbefore set forth. The elevation of the jack will continue until the rear end of the wagon supported thereby contacts with the chute and causes the same to bear upon the upper end of the bell-crank lever R, which will cause the lower arm of said lever to contact with the inner side of the upwardly-projecting arm of the L-shaped member Q², and thereby move the connecting-rod P laterally a sufficient distance on the shaft K² to cause the ratchet-face of the sprocket-wheel Q to disengage from the ratchet-surface on the collar k, secured to said shaft K². The lowering of the jack and the wagon supported thereby is effected in the manner hereinbefore set forth.

I have also provided a supplemental means for automatically releasing the hoisting mechanism, which will, in case the trip designed to be actuated by the chute should for any reason fail to operate, operate when the jack reaches its upward limit of travel. S designates a lever pivotally secured to one side of one of the supporting-beams A' adjacent the rear end thereof, the rear end of which terminates in a downwardly-bent portion s, which passes through a staple s', secured to the inner side of the connecting-rod P. T designates a second lever pivotally secured to one side of one of the supporting-beams A' just in advance of said lever S, the rear end of said lever being arranged to overlie the forward end of the lever S, and the forward portion of said lever extending upwardly and terminating in a horizontally-disposed portion t, in which are formed a plurality of apertures t'. U designates a laterally-extending pin designed to be adjustably supported in any suitable manner within either of the apertures t'. The pin U is arranged to overlie one of the beams b of the jack B so as to be engaged thereby during the upward travel thereof. When the pin U is engaged by the jack, the forward end of the lever S will be elevated, which will cause the rear end thereof to contact with the forward end of the lever S, and thereby depress the same. The depression of the forward end of the lever S will cause the downwardly-bent portion thereof to contact with the connecting-rod and move the same laterally a sufficient distance to disengage the clutch-face q of the sprocket-wheel Q carried thereby from the clutch-face of the collar k, secured to the shaft k², thereby releasing the hoisting mechanism. It will be apparent that by adjusting the pin U in the several apertures t' the hoisting mechanism can be released at various points during the upward travel of the jack. S' designates a hand-lever secured to the lever S and extending rearwardly below the supporting-bar and drag to a position accessible to an operator, so that the hoisting mechanism may be released manually when desired.

I do not desire to limit myself to the precise form and construction shown in the drawings, as it is obvious that many minor changes might be made thereto without departing from the spirit of the invention.

What I claim is—

1. In a wagon-dump, a power-shaft, a jack, means for elevating said jack, said jack and elevating means being fashioned to rest between the wheels of the wagon to be dumped, and gearing connecting the elevating means and power-shaft.

2. In a wagon-dump, a power-shaft, a supporting member fashioned to rest between the wheels of the wagon to be dumped, a jack pivotally secured to said supporting member for elevating said jack, and gearing connecting the elevating mechanism and power-shaft.

3. In a wagon-dump, a supporting member, a jack movable relative thereto, links interposed between said jack and the supporting member for effecting the elevation thereof and gearing for actuating said links.

4. In a wagon-dump, a supporting member, a jack pivotally secured thereto, toggle-links interposed between said jack and supporting member for effecting the elevation thereof and gearing for actuating said links.

5. In a wagon-dump, a supporting member, a jack pivotally secured thereto, and toggle-links interposed between the free end of said jack and supporting member for effecting the elevation thereof, one of said links having a portion projecting above the upper surface of said jack.

6. In a wagon-dump, a supporting member, a jack pivotally secured thereto, links interposed between said jack and the supporting member, a hoisting-drum, and a cable wound thereon and having a connection with said links.

7. In a wagon-dump, a supporting member, a jack pivotally secured thereto, a pair of links pivotally connected together and having their ends pivotally secured respectively to said jack and supporting member, a hoisting-drum, and a cable wound thereon and having a connection with one of said links.

8. In a wagon-dump, a supporting member, a jack pivotally secured thereto, toggle-links interposed between said jack and supporting member, a sheave secured to one of said toggle-links, a hoisting-drum, and a cable wound thereon, the free end of said cable passing around said sheave and being secured to said jack.

9. In a wagon-dump, a supporting member, a jack pivotally secured thereto, toggle-links interposed between said jack and supporting member, a hoisting-drum, an idler secured to said supporting member intermediate the toggle-links and hoisting-drum, a sheave secured to one of the toggle-links and adapted when the jack is in its lowermost position to extend below the upper surface of the idler secured to the supporting member, and a cable wound upon said hoisting-drum and passing over said idler and around said sheave, the free end of said cable being secured to the jack.

10. In a wagon-dump, a supporting member, a jack pivotally secured thereto, toggle-links interposed between said jack and supporting member, a hoisting-drum, a sheave secured to one of said toggle-links, a sheave secured to said jack, and a cable wound upon said hoisting-drum and passing around both of said sheaves, the free end of said cable being secured to said jack.

11. In a wagon-dump, a jack, and hoisting mechanism therefor including a drum, said jack and hoisting mechanism being fashioned to rest between the wheels of the wagon to be dumped.

12. In a wagon-dump, a supporting member, a jack adapted to act upon the forward end of a wagon to effect the elevation thereof, and power mechanism for elevating said jack including a drum, said supporting member, jack and elevating mechanism all being fashioned to rest between the wheels of a wagon when the same has been moved into position to be raised.

13. In a wagon-dump, a supporting member, a jack adapted to act upon the forward end of a wagon to effect the elevation thereof, and power hoisting mechanism for elevating said jack including a hoisting-drum carried by said supporting member, said supporting member, jack and elevating means all being fashioned to rest between the wheels of a wagon when the same has been moved into position to be raised.

14. In a wagon-dump, a longitudinally-disposed supporting-beam, a longitudinally-disposed jack movably secured thereto, and gearing for elevating said jack secured to said supporting-beam.

15. In a wagon-dump, a longitudinally-disposed supporting-beam, a longitudinally-disposed jack pivotally secured thereto, and gearing for elevating said jack secured to said supporting-beam.

16. In a wagon-dump, means for elevating the forward end of a wagon including a drum-shaft, a hoisting-drum clutched thereto, means for releasing said drum from engagement with said shaft to effect the lowering of the wagon, and means for braking said drum during the lowering of the wagon.

17. In a wagon-dump, means for elevating the forward end of a wagon including a drum-shaft, a hoisting-drum clutched thereto, means for releasing said drum from engagement with said drum-shaft, and means for simultaneously applying a brake to said drum.

18. In a wagon-dump, means for elevating the forward end of a wagon including a drum-shaft, a hoisting-drum clutched thereto, a brake therefor, means for releasing said drum from engagement with said shaft and simultaneously applying the brake thereto, and means preventing the release of said brake until the wagon has reached its normal position.

19. In a wagon-dump, a jack, hoisting mechanism therefor, means for releasing said hoisting mechanism to permit the downward movement of the jack, a brake for governing the downward movement of the jack, and means preventing the release of said brake until the jack reaches the limit of its downward movement.

20. In a wagon-dump, a jack, hoisting mechanism therefor, means for releasing said hoisting mechanism to permit the downward movement of the jack, and means for simultaneously braking the lowering movement of said jack.

21. In a wagon-dump, means for elevating the forward end of a wagon including a drum-shaft, a hoisting-drum loosely mounted thereon and provided on its interior with a clutch-face, a clutch keyed to said drum-shaft and longitudinally movable thereon, means for holding said clutch normally in engagement with the clutch-face of the hoisting-drum, a brake-disk loosely mounted on the drum-shaft adjacent one end of the drum and provided with a portion adapted to contact with said clutch to effect the release thereof when said disk is moved into engagement with the end of said drum.

22. In a device of the character described, means adapted to engage the forward end of a wagon to effect the elevation thereof, hoisting mechanism therefor, a drive-shaft for said hoisting mechanism, an elevator, a transverse conveyer arranged to swing upward and downward to permit a wagon to pass into position to be elevated, and means for detachably connecting the elevator with the drive-shaft of the hoisting mechanism.

23. In a device of the character described, means for elevating the forward end of a wagon, hoisting mechanism therefor, a drive-shaft therefor, an elevator, a drive-shaft therefor, and means for connecting the drive-shaft of the elevator with the drive-shaft of the hoisting mechanism, said means being movable to a position to permit a wagon to be driven into position to be acted upon by the elevating means.

24. In a device of the character described, means for elevating the forward end of a wagon, hoisting mechanism therefor, a drive-shaft for said hoisting mechanism, an elevator, a drive-shaft therefor, a connecting-bar pivotally supported from the drive-shaft of the elevator, and gearing carried by said connecting-bar for connecting the drive-shaft of the elevator with the drive-shaft of the hoisting mechanism.

25. In a device of the character described, means for elevating the forward end of a wagon, hoisting mechanism therefor, a drive-shaft for said hoisting mechanism, an elevator, a drive-shaft therefor, a laterally-movable connecting-bar pivotally supported from the drive-shaft of the elevator, a gear-wheel carried by said connecting-bar and adapted to engage the end of the drive-shaft of the hoisting mechanism, and gearing between said gear-wheel and the drive-shaft of the elevator.

26. In a device of the character described, means for elevating the forward end of a wagon, hoisting mechanism therefor, and means for automatically releasing said hoisting mechanism adapted to be actuated by the rear end of the wagon.

27. In a device of the character described, means for elevating the forward end of a wagon, hoisting mechanism therefor, means for releasing said hoisting mechanism including a clutch, and means actuated by the rear end of the wagon when it reaches its dumping position for shifting said clutch.

28. In a device of the character described, means for elevating the forward end of a wagon, hoisting mechanism therefor, means for releasing said hoisting mechanism including a clutch, a transversely-disposed conveyer, a chute pivotally secured to one side thereof, and a trip for releasing said clutch adapted to be actuated by said chute.

29. In a device of the character described, means for elevating the forward end of a wagon, hoisting mechanism therefor, a drive-shaft for said hoisting mechanism, a clutch member secured to said drive-shaft adjacent the end thereof, an elevator, a drive-shaft therefor, a laterally-movable connecting-bar pivotally supported from the drive-shaft of the elevator, a gear-wheel carried by said connecting-bar and adapted to loosely engage the end of the drive-shaft of the hoisting mechanism, a clutch member carried by said gear-wheel and adapted to normally engage a clutch member secured to the drive-shaft, gearing connecting said gear-wheel with the drive-shaft of the elevator, and means for moving said connecting-bar laterally to effect the release of the hoisting mechanism.

30. In a device of the character described, means for elevating the forward end of a wagon, hoisting mechanism therefor, a drive-shaft for said hoisting mechanism, a clutch member secured to said drive-shaft, an elevator, a drive-shaft therefor, a laterally-movable connecting-bar, supported from the drive-shaft of the elevator, a gear-wheel carried by said connecting-bar and adapted to loosely engage the end of the drive-shaft of the hoisting mechanism, a clutch member carried by said gear-wheel and adapted to normally engage the clutch member secured to the drive-shaft, gearing connecting said gear-wheel with the drive-shaft of the elevator, and means adapted to be actuated by the rear end of the wagon to be dumped for shifting said connecting-bar laterally to effect the release of the hoisting mechanism.

31. In a straddle-wagon dump, a pivoted jack, hoisting mechanism therefor, and means adapted to be actuated by said jack during its upward travel for releasing said hoisting mechanism.

32. In a straddle-wagon dump, a pivoted jack, hoisting mechanism therefor, an adjustable means adapted to be engaged by said jack during its upward travel for releasing said hoisting mechanism.

33. In a straddle-wagon dump, a pivoted jack, hoisting mechanism therefor, means for effecting the release of said hoisting mechanism including a clutch, and means adapted to be actuated by said jack during its upward travel for shifting said clutch.

34. In a wagon-dump, a dumping member, a power-shaft member positioned laterally therebeyond, and a power-transmitting coupling member detachably connected to one of said other members, whereby said coupling member may be moved to permit a wagon to move into dumping position.

In testimony whereof I affix my signature in presence of two witnesses.

JOHN F. WHITE.

Witnesses:
   HELEN M. BROWNING,
   M. M. THOMPSON.